US 6,975,060 B2

(12) United States Patent
Styblo et al.

(10) Patent No.: US 6,975,060 B2
(45) Date of Patent: Dec. 13, 2005

(54) MESO-TO-MICRO-SCALEABLE DEVICE AND METHODS FOR CONVERSION OF THERMAL ENERGY TO ELECTRICAL ENERGY

(76) Inventors: Donald Styblo, 212 N. Oakmont Dr., Northfield Center, OH (US) 44067; Matthew E. Moran, 2313 Fawn Haven Dr., Medina, OH (US) 44256; Franklyn T. Bradshaw, 3299 Aberdeen Rd., Shaker Heights, OH (US) 44120

( * ) Notice: Subject to any disclaimer, the term of this patent is extended or adjusted under 35 U.S.C. 154(b) by 65 days.

(21) Appl. No.: 10/354,943

(22) Filed: Jan. 30, 2003

(65) Prior Publication Data

US 2004/0150298 A1 Aug. 5, 2004

(51) Int. Cl.[7] ............................................. H02N 2/00
(52) U.S. Cl. ..................................... 310/306; 310/339
(58) Field of Search ................................. 310/306, 339

(56) References Cited

U.S. PATENT DOCUMENTS

| 5,571,339 | A | 11/1996 | Ringel et al. | |
|---|---|---|---|---|
| 6,034,321 | A | 3/2000 | Jenkins | |
| 6,385,973 | B1 * | 5/2002 | Moran | 60/520 |
| 6,482,672 | B1 | 11/2002 | Hoffman et al. | |
| 6,580,177 | B1 | 6/2003 | Hagood, IV et al. | |
| 6,660,928 | B1 | 12/2003 | Patton et al. | |
| 6,734,597 | B1 * | 5/2004 | Howell et al. | 310/306 |
| 6,906,449 | B2 * | 6/2005 | Kucherov et al. | 310/306 |

OTHER PUBLICATIONS

Human-powered wearable computing by T. Starner, IBM Systems Journal, vol. 35, Nos. 3 & 4, 1996.

* cited by examiner

Primary Examiner—Darren Schuberg
Assistant Examiner—J. Aguirrechea

(57) ABSTRACT

The present invention provides systems and methods for conversion of thermal energy to electrical energy. The devices and methods according to the invention allow for efficient conversion of thermal energy to electrical power in a meso-to-micro scale device. In general, the present invention relates to a device for converting thermal energy to electrical energy comprising a working fluid contained within at least one region. The region is exposed to a thermal gradient and thermal energy is transferred through at least a first thermal energy-accepting layer for transferring thermal energy to the working fluid. At least one diaphragm is acted upon by the working fluid, which thermodynamically expands upon thermal energy being transferred thereto to flex the diaphragm. A mechanism is provided for converting the structural flexure of the diaphragm to electrical energy, along with at least one thermal energy transfer mechanism for transferring thermal energy from the working fluid through the diaphragm to cool the working fluid and cause thermodynamic contraction thereof. The thermodynamic cycle of heating and cooling the working fluid causes expansion and contraction thereof in turn causes cyclic flexure of the diaphragm in response to the device being exposed to thermal energy. The cyclic flexure of the diaphragm in conjunction with other structures produces the desired conversion to electrical energy.

20 Claims, 4 Drawing Sheets

MESO-TO-MICRO-SCALEABLE DEVICE AND METHODS FOR CONVERSION OF THERMAL ENERGY TO ELECTRICAL ENERGY

TECHNICAL FIELD

This invention relates generally to devices and methods for conversion of thermal energy to electrical energy, and more particularly to devices and methods for such conversion using micro-electro-mechanical systems (MEMS). The thermal energy may be created deliberately by combustion or other process, or it may be generated as waste heat, the unintended byproduct of other processes.

BACKGROUND OF THE INVENTION

Many devices and systems produce waste thermal energy, which is typically lost to the environment and results in inefficiencies in operation of such systems. For example, electrical equipment produces waste heat, which can adversely affect operation of the equipment, thereby requiring various approaches to remove the heat from the system, and potentially requiring additional energy. Systems which have been used to remove waste heat in such situations include forced air systems, heat exchanger systems, heat radiating structures or others, which assist in removing waste heat from the vicinity of the heat source.

Other systems, such as mechanical devices, may also produce waste heat in their operation, due to friction, energy conversion or other operational characteristics. Again, in such systems, waste heat may simply vent to the environment or cooling systems are used to dissipate or remove waste heat from the system.

In still other systems, such as biological systems, waste heat may be generated due to physiological processes for example.

In each of these types of systems, as well as a variety of other possible systems and situations, unintended thermal energy may present problems in the desirable operation and function of such systems, or simply may be lost to the environment.

There have also been developed various systems for converting thermal energy to other energy forms, whether the thermal energy is generated intentionally or unintentionally. As examples, recovery of thermal energy may be possible using heat pumps, including chemical heat and cooling pumps, thermal-acoustical heat and cooling pumps, Stirling cycle systems, or various other systems for capturing and converting thermal energy for re-use. Similarly, various systems have been developed for conversion of thermal energy to other useful forms of energy, including pyro-electrical conversion, thermal-electrical conversion, thermal ionic conversion, gas cycle conversion systems, such as Stirling devices, Brayton, etc., and absorption cycle systems as examples. Devices for conversion of thermal energy to other energy forms have historically been large, and in many cases require moderate-to-high temperature differentials for effective operation. Further, such systems include mechanical components, which are subject to friction and wear, limiting the efficiency of the system. Further, contemporary conventional conversion processes and manufacturing processes limit the device size to dimensions much larger than are compatible with many of the types of systems where thermal energy is generated.

It would therefore be worthwhile to provide methods and systems which can convert thermal energy into electrical power and which overcome limitations associated with the foregoing systems and approaches. It would also be desirable to provide such capabilities in a meso-to-micro scale device, wherein micro-electro-mechanical systems (MEMS) technology, allows the manufacture of devices having sizes which are greatly reduced from prior art systems.

SUMMARY OF THE INVENTION

The present invention addresses the above needs and objectives for providing systems and methods for conversion of thermal energy to electrical energy. The devices and methods according to the invention allow for efficient conversion of heat or other thermal energy to electrical power in a meso-to-micro scale device. In general, the present invention relates to a device for converting thermal energy to electrical energy comprising a working fluid contained within at least one region. The region is exposed to a thermal gradient and thermal energy is transferred through at least a first thermal energy accepting layer for transferring thermal energy to the working fluid. At least one diaphragm is acted upon by the working fluid, which thermodynamically expands upon thermal energy being transferred thereto to flex the diaphragm. A mechanism is provided for converting the structural flexure of the diaphragm to electrical energy, along with at least one thermal energy transfer mechanism for transferring thermal energy from the working fluid through the diaphragm to cool the working fluid and cause thermodynamic contraction thereof. In a thermal gradient, the thermodynamic cycle of heating and cooling the working fluid to cause expansion and contraction thereof in turn causes cyclic flexure of the diaphragm in response to the device being exposed to thermal energy. The cyclic flexure of the diaphragm in conjunction with other structures produces the desired electrical energy, effectively converting the thermal energy.

In conjunction with the device described above or independently, it is also possible to convert thermal energy to electrical energy by means of a device or mechanism for infra-red (IR) power conversion. The mechanical device described above could also be used with other types of energy conversion system if desired, such as thermionic or thermoelectric devices and/or others. When the IR power conversion or other conversion device is used in conjunction with the thermal energy conversion device described above, the overall efficiency of the conversion system can be further increased. In such an embodiment, an IR power conversion area or other conversion system may be provided in association with the heat transfer mechanism or surface of the device. For such an alternate embodiment, conversion of thermal energy to electrical energy is supplemented, and with respect to an IR power conversion system, conversion can occur even if the device is not positioned in a thermal gradient.

There is also provided a method of converting thermal energy to electrical energy, and methods of fabricating a device for conversion of thermal energy to electrical energy.

These and other objects and advantages of the invention will become apparent upon a reading of the description of the invention in conjunction with the drawings.

DESCRIPTION OF THE INVENTION

Figure 1:
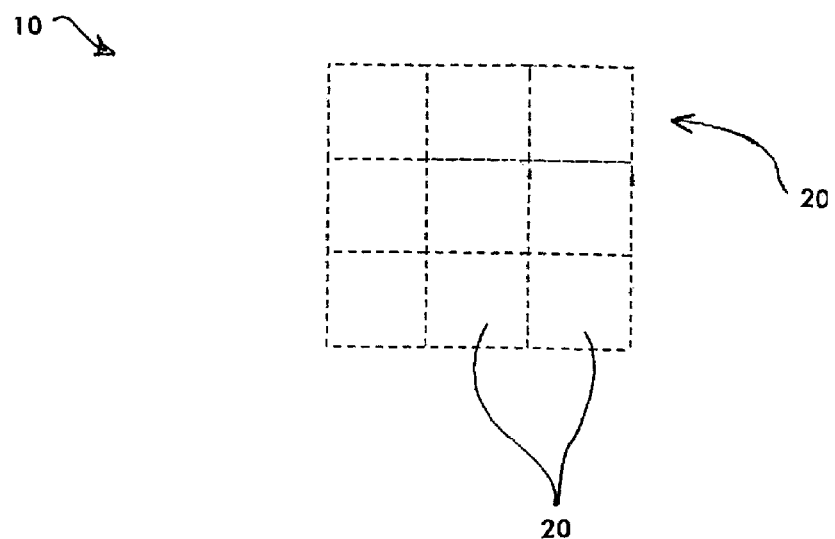
FIG. 1 is a top elevational view of an embodiment of the invention comprising several individual conversion devices.

Referring now to the drawings, FIG. 1 shows a system 10 for conversion of thermal energy to electrical energy according to an embodiment of the invention. The system 10 may have a square configuration, such as shown in FIG. 1, but the shape of the system or devices according to the invention may be of any desired configuration. In this manner, the system 10 can be configured to be adapted for a particular application or environment, where an alternative shape may be more efficient or convenient for integration and use with a device, medium or environment in which it is used. In this embodiment, the system 10 is also fabricated as a meso-to-micro scale device, wherein it can be used in conjunction with miniaturized equipment or devices or environments where larger scale devices simply could not be implemented. In this regard, the system and methods according to the invention provide the ability to convert thermal energy into electrical energy at an electronic chip-scale, which may be used in a broad variety of applications, such as in association with in-situ sensors or devices, or with miniaturized electrical devices or circuits as merely examples. The conversion system and methods according to the invention thereby may provide auxiliary power for use with portable power sources, which typically dictate the performance characteristics of various electrically powered systems. Additionally, in many devices and environments, waste heat generation by electronics or other systems can create significant problems, particularly as increased power requirements and smaller packaging volumes have exacerbated problems associated with waste thermal energy. The device 10 may include a plurality of conversion modules or devices 20 operating together for providing certain auxiliary power requirements, or for conversion of an amount of thermal energy created or present within a system or by a device. The conversion modules 20 provide conversion of thermal energy to electrical energy, such as for use in heat generating environments where an inherent temperature differential or gradient exists, again being a wide variety of potential systems, equipment or environments. The electrical energy generated may be used as auxiliary power for a system, or may be the primary power for a system such as a self-powered sensor or other electronics. As the system 10 or modules 20 can be fabricated on a meso-to-micro-scale size, it may also be possible to use such a device within the human or other body, wherein waste heat is being generated from physiological processes or the like. Thus, the systems and method according to the present invention are not limited to particular applications, as the variety of applications where a temperature differential exists which can be taken advantage of by means according to the invention are potentially endless.

Figure 2:
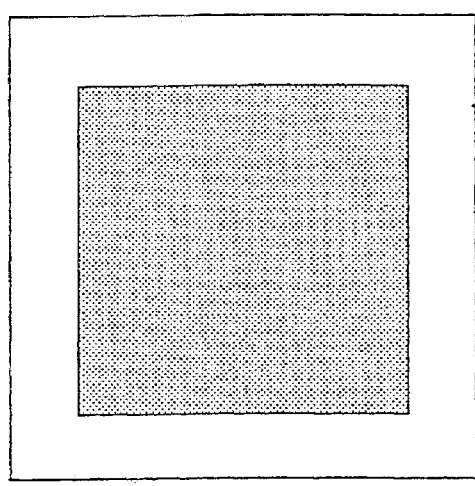
FIGS. 2 and 3 are enlarged top and side views of one of the conversion devices as shown in FIG. 1.
Figure 3:
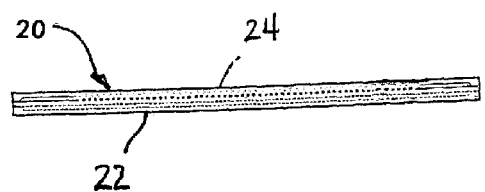

A thermal conversion module 20 is shown in FIGS. 2 and 3, according to an embodiment of the invention. As shown in these figures, the conversion module 20 may be formed having a planar geometry and footprint, which may be particularly compatible for use with sensors or other miniaturized electronic components. As an example, the module 20 may have an overall volume less than 10 cubic centimeters (less than 0.6 cubic inches), and at a micro-scale approximately one square centimeter. If desired, the system according to the present invention could also be made at a larger scale for a particular application or environment. Further, as shown in FIG. 1, system 10 may be configured to have a plurality of conversion modules 20 in a planar or curvilinear configuration to increase power output, extend coverage over a surface area, or for use in high heat flux applications as will be described further.

The conversion module 20 may be formed of a plurality of layers formed in conjunction with one another. Due to the configuration of the conversion modules 20 to be hereinafter discussed, and the possible miniaturization of the devices and systems according to the invention, micro-electro-mechanical system (MEMS) technology may allow desired micro scale structures to be formed in the device 20. Similarly, microchip fabrication methods and semiconductor processing techniques are suitable for the production of systems and devices according to the invention. For example, microchip fabrication methods used in conjunction with conventional printed circuit board, integrated circuit, metalization and pick and place or flip-chip technologies may be applied.

In a planar configuration as shown, the conversion module 20 comprises a first thermal energy transfer surface or layer 22, which may be adapted to physically contact a device or equipment generating thermal energy, or be positioned adjacent a source of thermal energy. A second thermal transfer layer or surface 24 is thereby positioned relative to first layer or surface 22 at a point further from the source of thermal energy. In this manner, the first and second thermal transfer surfaces or layers 22 and 24 operate across a temperature gradient generated in proximity to a source of thermal energy. Electrical power distribution leads (not shown) may be provided in conjunction with conversion module 20 to allow withdrawal of electrical power created by the device. In this configuration, semiconductor-processing techniques allow etching of various structures into the conversion module 20 as will be hereinafter described.

Figure 4:
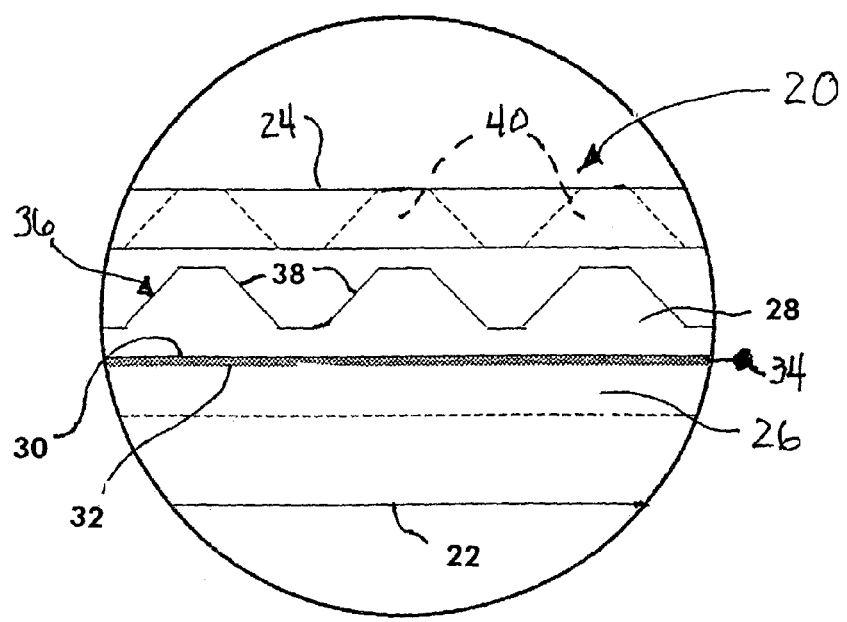
FIG. 4 is a partial cut-away view of a portion of one device as shown in FIG. 2.

Turning to FIG. 4, there is shown an embodiment of the conversion module 20 for of thermal energy to electrical energy across a thermal gradient. The conversion device 20 in this embodiment combines the inherent efficiencies of thermodynamic fluid cycles with the scalability of MEMS technology. Low mass microstructures may be created in semiconductor material using wet-etching techniques for example. The first and second surfaces or layers 22 and 24 provide a heat-accepting surface and a heat-dissipating surface respectively; with microstructures formed therebetween to effectively utilize the thermal energy transferred therethrough and convert the same to electrical energy. Between surfaces 22 and 24, a sealed cavity or chamber 26 is formed, and thermal energy is transferred from surface 22 through the material of device 20 to the chamber 26. Within chamber 26, there may be provided a working fluid, such as working gas, which may be selected for its thermodynamic characteristics. Desirably, chamber 26 is hermetically sealed to contain working fluid therein without leakage. The working fluid may also be pressurized within chamber 26 if desired, and surfaces of chamber 26 may be coated to prevent diffusion of the working fluid. A diaphragm member 28 is disposed so as to be acted upon by thermal expansion of the working fluid within chamber 26. The diaphragm member 28 may have a surface 30 serving to form a surface of chamber 26 so as to be acted upon by thermal expansion of working fluid within chamber 26, or could be indirectly acted upon by such expansion if desired. Thermal energy is transferred to the working fluid through heat-accepting surface 22, and is expanded within the chamber 26 to act on the diaphragm member 28 and cause movement thereof. As an example, the working fluid could be hydrogen or helium gas that is hermetically sealed in chamber 26 adjacent the diaphragm member 28. Any other suitable gas or other fluid may be used. As an example, a single or multi-phase gas, a liquid phase or a combination of gas and liquid phase materials may be used.

In this embodiment, surface 30 of the diaphragm member is coated with a piezoelectric material layer 32. An output terminal 34 is schematically shown to be coupled to the piezoelectric coating layer so as to electrically couple the piezoelectric coating for channeling of electrical energy created thereby. Piezoelectric materials produce an electrical charge displacement when strained, which strain could be caused by mechanical deformation of the piezoelectric material, thermal strain imposed upon the piezoelectric material or other stress. Upon straining the piezoelectric material, the charge displacement is associated with an electrical field applied over a distance, and results in an electrical potential difference in the material. The strain-induced electrical displacement results from a reorganization of molecules within the material when subjected to a strain. In this embodiment, movement of the diaphragm member 28 causes mechanical straining of the piezoelectric material layer 32 so as to produce an electrical charge, which can be output to the output terminal 34.

Anisotropic etching of the semiconductor material can also form structures in the device to enhance its operation. For example, the diaphragm member 28 may be formed to include structures 38 on surface 36 of diaphragm member 28. The structures 38 serve to significantly increase the surface area of diaphragm member 28 on this surface to enhance thermal transfer from the surface. In the heat-dissipating layer 24 of device 20, corresponding shaped recesses 40 may be formed to accept structures 38 associated with the diaphragm member 28 therein.

The diaphragm member 28 is sealed at its ends with respect to layers 22 and 24 in a cavity formed between these layers, thereby forming in this embodiment, chamber 26 in which the working fluid is hermetically sealed. As should be recognized, upon expansion of the working fluid within chamber 26, diaphragm member 28 will be moved upwardly such that surface 36 will contact the interior surface of layer 24. In this manner, the structures 38 formed on the diaphragm member 28 will be received in and contact the recessed areas 40 associated with layer 24. Above the diaphragm member 28, the area within the formed cavity may be open to the ambient environment via the slanted through-holes formed in association with recesses 40. Similarly, the heat-dissipating surface 24 may be wafer bonded to the diaphragm member 28 at two or more of its edges to increase access to the ambient environment from this region. Upon movement of the diaphragm member 28 within the cavity, air (or other fluid) above the diaphragm member can therefore easily move out of the assembly to minimize resistance to diaphragm oscillation. The cavity above the diaphragm member 28 may or may not be open to the ambient environment, but if so, this may also provide self-cooling airflow through and underneath the heat dissipating surface 24. The particular configuration of the heat dissipation surface 24 to allow or enhance the self-cooling flow through and underneath the surface may be modified according to a particular application, or the material from which the heat-dissipating surface 24 is constructed may have differing thermal transfer characteristics to allow dissipation of thermal energy transferred through the working gas to the diaphragm member 28. Further, active cooling of heat dissipation surface may be provided if desired.

In operation, and within a thermal gradient, thermal energy will be transferred through surface 22 to the working fluid within cavity 26. The working gas expands upon heating up, so as to force movement of the diaphragm upwardly until it is in contact with heat dissipating surface 24. The movement of the diaphragm member 28 causes mechanical strain of the piezoelectric material layer 32 so as to generate electrical energy in response to the thermal expansion. Upon engaging the heat-dissipating surface 24, diaphragm member 28 will transfer thermal energy to and through the heat-dissipating surface 24 or to be removed to the ambient atmosphere through the through holes 40 or other passages in layer 24 which are open to the ambient atmosphere. Upon dissipation of thermal energy, the working gas temperature adjacent the diaphragm member 28 will be cooled and will contract to the point that diaphragm member 28 disengages from the heat-dissipating surface 24 to complete a cycle of operation. The oscillation of diaphragm 28 and cyclic flexure of the Piezoelectric material layer 32 in association with the diaphragm 28 produces electrical power which can be rectified to produce a desired output via leads or traces coupled to the Piezoelectric coating 32. The operating frequency of the cyclic operation of the diaphragm member 28 in association with the gas cycle thermodynamics created by the working gas within cavity 26, will be dependent upon various factors, and may be tuned for a particular operational frequency. As merely an example, the operating frequency of the device may be dependent upon the heat flux of the thermal gradient, the dimensions of the device, the type of working fluid, whether the working fluid is pressurized as well as other possible factors or other operating characteristics. For a meso-scaled device, wherein the footprint area of the device is on the order of centimeters, and the thickness is on the order of millimeters, the operating frequency may be in the range inclusive of, but not limited to, 100 Hertz to several Kilohertz. As mentioned, based upon a selection of the various factors contributing to the resonant frequency of the device, there is provided the ability to tailor the resonant frequency to interface with the overall system in which it is used, and thereby potentially avoid interference that may be created based upon integration of the device into a system. Further, the resonant frequency may be chosen to be compatible with vibrational frequencies of equipment or the like, to either avoid interference, or to supplement movement of the diaphragm to enhance or increase power output by utilizing environmental vibrations. Depending upon the nature of the vibrational environment, it may even be possible to operate the device 20 without a thermal gradient, wherein only the vibrational environment produces movement of the diaphragm. Alternatively, by providing an ability to tailor the resonant frequency, there is also provided the commensurate ability to cancel out induced vibrations in vibration-sensitive applications, by designing multiple devices 20 to operate out of phase with one another. Such an array of a plurality of devices could therefore be tuned relative to one another to operate at a desired resonance frequency, and to potentially work in conjunction with one another to provide unique capabilities.

Figure 5:
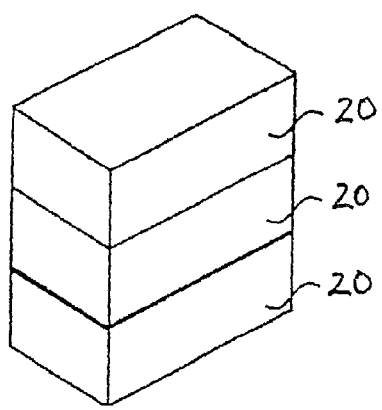
FIG. 5 is a schematic view of a plurality of devices according to the invention in series.

A plurality of devices can also be formed to work in conjunction with one another in a manner to enhance overall operation of the system with respect to a given application or environment. The modular design of the conversion devices 20 allows one or more devices 20 to be used for a particular application or environment, to convert thermal energy to electrical energy. By operating a plurality of devices 20, it may be possible to increase the conversion capacity in a particular application or environment, to make use of overall heat flux present within a given application or environment. As shown in FIG. 5, a plurality of devices 20 may be operated in series, wherein the devices 20 are stacked upon one another to provide a desired power output or to accommodate applications or environments where higher heat flux is present. In this embodiment, each individual device 20 will operate substantially as described previously, with a temperature gradient provided across each device 20 as thermal energy is successively transferred from a device 20 adjacent a thermal source to the next adjacent device and so forth along a thermal gradient. As thermal energy is converted to electrical energy, the thermal gradient will decrease, but as long as such a gradient is still present, will allow proper operation of the devices accordingly. Although three devices 20 are shown in a series configuration in FIG. 5, any desired number of devices 20 may be used for a particular application or environment.

Figure 6:
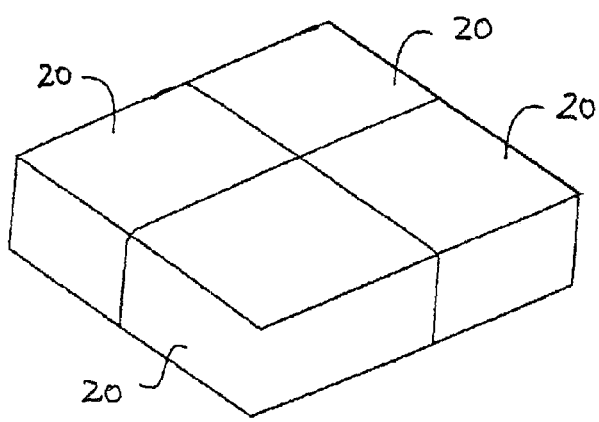
FIG. 6 is a schematic view of a plurality of devices according to the invention connected in parallel.

Alternatively, as shown in FIG. 6, a plurality of devices 20 may be operated in parallel to provide conversion of thermal energy to electrical energy over any desired surface area. The ability to configure the devices 20 in a parallel arrangement allows the overall system, such as system 10 of FIG. 1, to be tailored to a particular device or apparatus with which it may be used, or other source of thermal energy. Because the possible devices and systems with which the device 20 may be used can vary significantly, the ability to tailor a system comprising a plurality of devices 20 for a particular device or apparatus greatly enhances the flexibility and use of the invention. Similarly, combinations of series or parallel arrangements of a plurality of devices 20 combined into an overall system are contemplated herein. Further, providing a plurality of devices 20 in conjunction with one another may also be used in association with curvilinear surfaces, with the system of devices 20 following a curved or other non-planar surface, as each individual device 20 is very small relative to the non-planar characteristics of surfaces, so as to allow a plurality of units to be configured to follow such surfaces.

From the foregoing, it should be apparent that the present invention provides devices and methods for conversion of thermal energy to electrical energy to supplement or provide power requirements for varying applications or environments. As merely examples, the electrical power generation capabilities of the devices may provide the ability to not only decrease waste heat generation in many electronic packages and applications, but also provide increased power requirements in smaller packaging volumes. The present invention provides both the ability to effectively manage thermal energy in a variety of environments, but also the ability to effectively convert this thermal energy into useable electrical energy. The generated power may be particularly useable in environments or applications where conventional power sources are cumbersome or otherwise adversely effect a desired configuration for the device or system.

It should therefore be recognized that the present invention may be particularly adapted for use with electronic devices, self-powered sensors, or a variety of other applications where systems or devices are remote from conventional power sources. In such applications and environments, the present invention can supplement battery power sources associated with systems or equipment, or may provide all power necessary for the particular application. The device according to the invention can also be used in environments where thermal energy is a constant environmental factor, such as in association with the human or other animal body, wherein physiological processes generate heat. Thus, the invention may provide an alternative or supplemental power generation system for implantable devices, self-powered sensors or the like, which are becoming prominent in the medical field. It should also be apparent that for a particular application or system, an artificial source of thermal energy may be provided to cause operation of the device for generating electrical power, and nothing limits operation of the device to only conversion of waste heat. The present invention is also particularly adapted for conversion of thermal energy in low-grade thermal environments, which heretofore have not been addressed, primarily due to limitations on scalability of other thermal energy conversion systems. Certain applications and environments may also allow the diaphragm member associated with the device 20 to be acted upon by other force parameters to generate electrical energy. For example, it may be possible to mechanically stress the diaphragm member 28 in the embodiment of FIG. 4 by means of a source of pressure exerted on the diaphragm member from above, such as fluid pressure from an available source. Electrical power generation could be supplemented in such a fashion.

Figure 7:
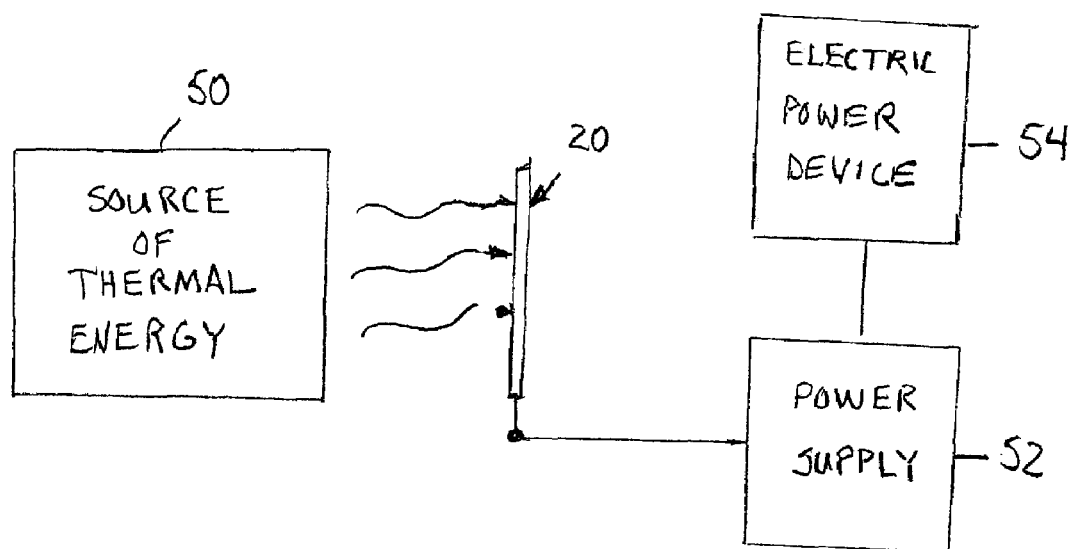
FIG. 7 is a schematic diagram of a system using a device according to the invention for conversion of thermal energy created by an associated device or environment.

Turning now to FIG. 7, a schematic illustration of a system for conversion of thermal energy to electrical energy is shown according to the present invention. Any source of thermal energy 50, whether waste thermal energy or otherwise, may serve to create a thermal gradient in which at least one device 20 according to the present invention is exposed. In the manner as described previously, at least one device 20 will produce an electrical current which may be directed to a power supply for storage or to operate an electrically powered device 54. Depending upon the particular source of thermal energy 50, the characteristics of the system incorporating at least one device 20 may be tailored for efficient and effective conversion of the thermal energy to electrical energy.

Figure 8:
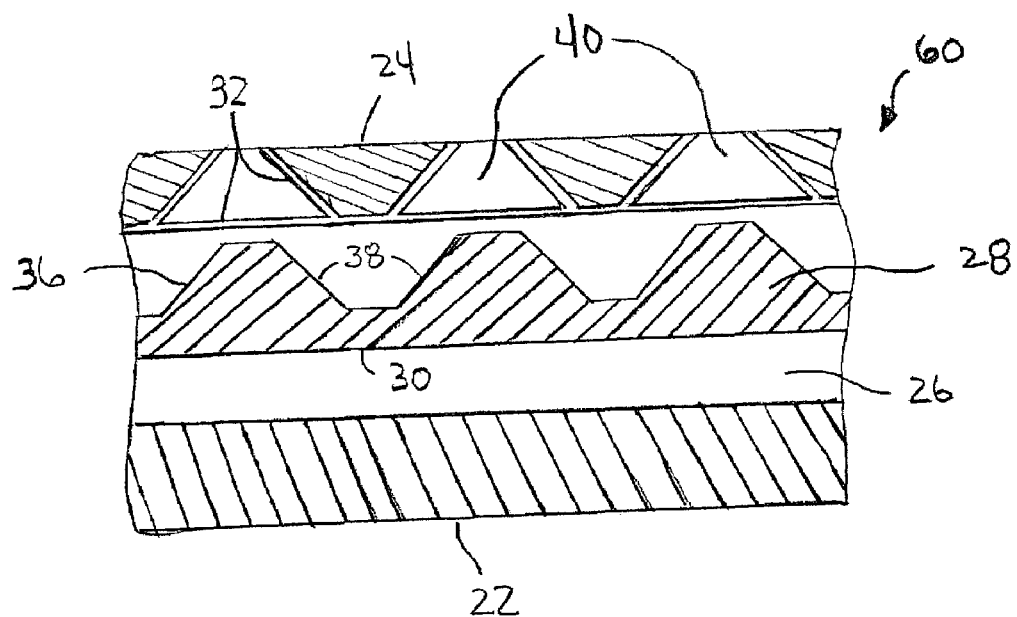
FIG. 8 is a partial cut-away view of an alternate embodiment of a device according to the invention.

Further, as an alternative to the arrangement shown in FIG. 4, a device 20 may be configured such as shown in FIG. 8. A device 60 according to this embodiment of the invention has similar components referenced by similar reference numerals to that of the embodiment of FIG. 4. In this embodiment, instead of sputtering a coating of Piezoelectric material 32 on at least one surface of the diaphragm member 28, the Piezoelectric material layer 32 is positioned on the interior surfaces of layer 24, such that upon exposure to a thermal gradient, the diaphragm member 28 will be moved into engagement with the interior surface of layer 24 in a manner similar to that previously described. In this situation, the piezoelectric material 32 will be strained upon pressure being exerted from the engagement of the diaphragm member 28, or from the transfer of thermal energy therethrough from the diaphragm member 28 to the layer 24. As the nature of the piezoelectric material merely requires that it be strained in some manner, this alternative approach may be sufficient to produce the desired electrical current from the piezoelectric material, or other such possible configurations are contemplated herein.

Figure 9:
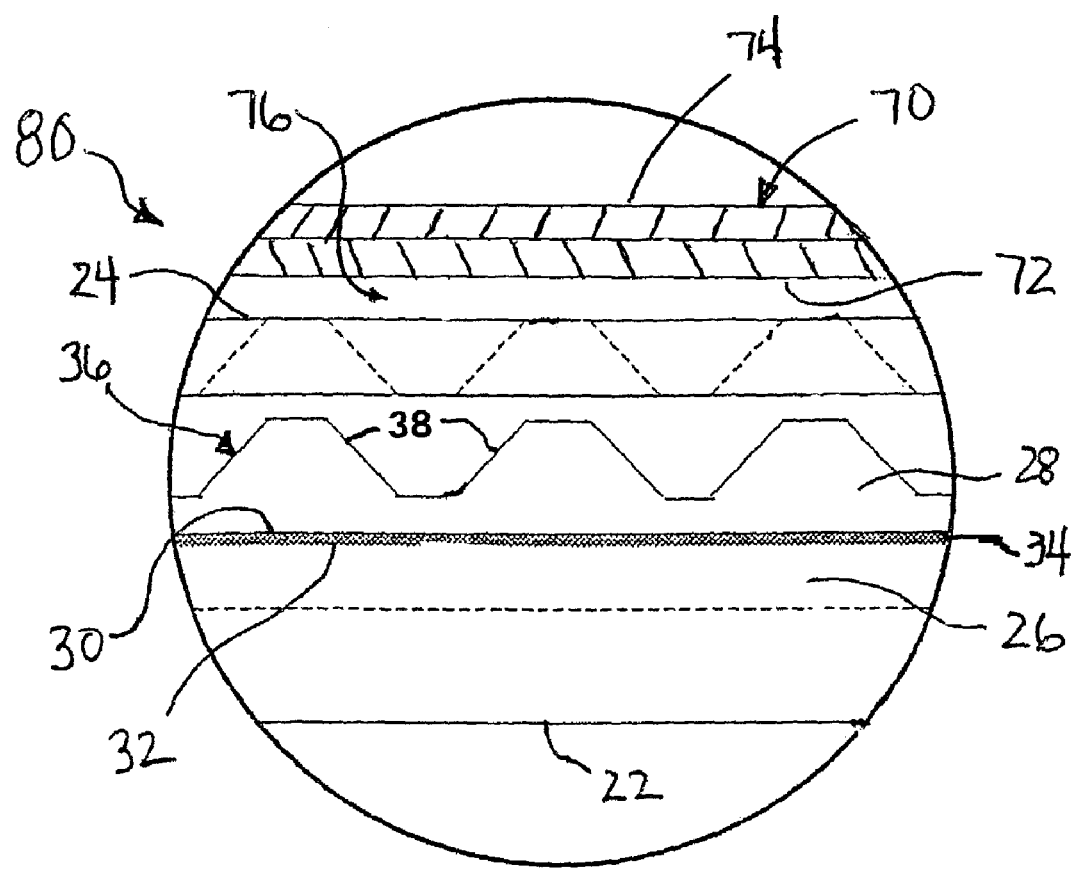
FIG. 9 is a partial cut-away view of an alternate embodiment of a device according to the invention, having an infra-red (IR) power conversion system associated therewith.

In a further embodiment as shown in FIG. 9, it is also possible to utilize a complementary thermal energy to electrical energy conversion system with the device 20 or 60 as an example. Alternatively, the complementary conversion system could be used independently or could operate independently in certain environments even if combined with another conversion system as in this embodiment. In FIG. 9, a photonic energy conversion system generally indicated at 70, such as an IR power conversion system, is employed in conjunction with the conversion device 80. In this embodiment, the other aspects of device 80 may be consistent with the features of the thermal energy conversion device 20 as described previously, but may also be similar to the embodiment 60 if desired. As shown, the photonic conversion device 70 may be associated with the surface 24 of system 80, but it should be understood that the IR power conversion system 70 could be positioned in another relationship relative to device 80. In this configuration, the photonic conversion device 70 does not interfere with the conduction of heat to device 80 from a heat source, and will still be subject to IR radiation from the heat source to convert it to electrical energy. In this embodiment, the photonic conversion device 70 may include one or more layers of photocells, and in this embodiment, layers 72 and 74 are provided. The layers 72 and 74 may include a plurality of photocells thereon, such that IR radiation from a heat source incident upon the layers 72 and 74 will be converted by the photocells to electrical energy. Depending on the nature of the heat source, the frequencies of IR radiation can vary to some degree, and it may therefore be worthwhile to provide photocells, which are tuned to the particular frequencies in an environment. There may also be several frequencies of radiation emitted from a heat source, and different layers could be provided for each dominant frequency encountered, such as with a plurality of layers 72 and 74 (or others), with each tuned to convert radiation in a bandwidth of particular frequencies. The ability to tune the photocells and/or layers to a particular bandwidth of IR energy can tailor the system to capture and convert such energy efficiently. The layers 72 and 74 may be coextensive with the layer 24 or of another configuration as desired, and are desirably spaced from the layer 24 or another portion of the device 80 such that radiant energy from the heat source is transmitted across the space 76 to be incident upon the photocells. Alternatively, the layers 72 and 74 may be disposed to have IR radiant energy directly incident upon the photocells from the heat source. In this embodiment, the photonic conversion system 70 does not rely upon a thermal gradient in the conversion of thermal energy to electrical energy, but merely requires incident radiant energy on the photodetectors. Thus, the device 70 could operate independently of the thermal energy conversion device 20 (or 60), or may operate at times where the device 20 or 60 is not in operation.

Although the present invention has been described with reference to specific embodiments, it is to be understood that the systems and methods of the present invention are not to be limited thereby. The objects and advantages of the present invention, among those made apparent from the preceding description are obtained, and certain changes or modifications may be made without departing from the scope of the invention. The above description is therefore intended to be interpreted as illustrative, and not limiting, and the invention is only to be limited by the appended claims.

What is claimed is:

1. A method of converting thermal energy into electrical energy comprising the steps of:
   providing a device having at least one thermal energy accepting surface and a working fluid contained within at least one region, wherein the region is exposed to thermal energy from the at least one first thermal energy accepting surface, wherein the working fluid thermodynamically expands in response to such exposure;
   exposing at least one diaphragm to be acted upon by the working fluid so as to flex in response to expansion of the working fluid, a piezoelectric material being disposed such that flexure of the diaphragm converts at least a portion of the mechanical energy of the diaphragm to electrical energy; and
   transferring thermal energy from the working fluid to cool the working fluid and cause contraction thereof, whereby the at least one diaphragm cyclically flexes in response to a the device being exposed to a thermal energy gradient.

2. A device for converting thermal energy to electrical energy comprising:
   a working fluid contained within at least one region, wherein the region is exposed to thermal energy from at least a first thermal energy accepting layer for transferring heat from a heat source to the working fluid, wherein the working fluid thermodynamically expands and contracts;
   at least one diaphragm that is acted upon as the working fluid expands and contracts so as to flex the diaphragm;
   a mechanism for converting the structural flexure of the diaphragm to electrical energy; wherein
   transferring thermal energy from the working fluid to cool the working fluid causes cyclical flexure of the at least one diaphragm in response to the device being exposed to thermal energy.

3. The device of claim 2 wherein the working fluid is selected from the group consisting of a single-phase gas, a mixture of liquid and gas phases and a liquid phase.

4. The device of claim 2 wherein the device is fabricated on a meso-to-micro scale.

5. The device of claim 2 wherein the mechanism for converting structural flexure to electrical energy is a piezoelectric material which is strained by the operation of the diaphragm.

6. The device of claim 5 wherein the piezoelectric material is strained by the movement of the diaphragm.

7. The device of claim 5 wherein the piezoelectric material is strained by the transfer of thermal energy through the diaphragm and to the piezoelectric material.

8. The device of claim 2 wherein the mechanism for converting structural flexure to electrical energy is a piezoelectric material which is positioned on at least one surface of the diaphragm and is strained by the movement of the diaphragm.

9. The device of claim 2 wherein the diaphragm contains at least one structural feature to increase the surface area of at least a portion thereof.

10. The device of claim 2, wherein the at least one region is hermetically sealed.

11. The device of claim 2, further comprising a second system for converting thermal energy to electrical energy associated with the device.

12. The device of claim 11, wherein the second system is used either complementary or independently of the device.

13. The device of claim 11, wherein the second system is a photonic energy conversion system.

14. The device of claim 13, wherein the photonic energy conversion system is an IR power conversion system, having at least one layer of a plurality of photocells positioned to be subject to IR radiation from the heat source to convert it to electrical energy.

15. The device of claim 14, wherein the photonic energy conversion system comprises photocells tuned to at least two different wavelengths of IR radiation.

16. The device of claim 2, further comprising a system for transferring thermal energy from the working fluid through the diaphragm to cool the working fluid and cause flexure of the diaphragm.

17. The device of claim 16, wherein the system is at least one thermal energy transfer device.

18. The device of claim 17 wherein the at least one thermal energy transfer device for transferring thermal energy from the working fluid through the diaphragm to cool the working fluid is at least one cooler structural layer which contacts the diaphragm during its cyclic flexure.

19. The device of claim 18 wherein the diaphragm contains at least one structural feature to increase the surface area of at least a portion thereof, and the at least one cooler structural layer has at least one structural feature corresponding to the at least one structural feature in the diaphragm.

20. The device of claim 19 wherein the at least one structural feature on the diaphragm is an outwardly extending boss, and the at least one structural feature associated with the at least one cooler structural layer comprises at least one opening in the cooler structural layer to accept the outwardly extending boss.

* * * * *